(12) United States Patent
Day

(10) Patent No.: US 7,698,724 B1
(45) Date of Patent: Apr. 13, 2010

(54) CONVERGENCE PROCESSOR FOR MEDIA STREAMS

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1400 days.

(21) Appl. No.: 10/439,120

(22) Filed: May 15, 2003

(51) Int. Cl.
*H04N 7/173* (2006.01)

(52) U.S. Cl. .............................. 725/97; 725/95; 725/96; 725/87; 725/88; 725/101; 725/103

(58) Field of Classification Search ............. 725/95–97, 725/87–88, 101, 103
See application file for complete search history.

(56) References Cited

U.S. PATENT DOCUMENTS

| | | | | |
|---|---|---|---|---|
| 6,859,839 | B1 * | 2/2005 | Zahorjan et al. | 709/231 |
| 6,934,759 | B2 * | 8/2005 | Hejna, Jr. | 709/231 |
| 7,111,316 | B1 * | 9/2006 | Zahorjan et al. | 725/97 |
| 7,143,432 | B1 * | 11/2006 | Brooks et al. | 725/105 |
| 7,200,669 | B2 * | 4/2007 | Cheung et al. | 709/231 |
| 7,237,254 | B1 * | 6/2007 | Omoigui | 725/94 |
| 7,263,275 | B2 * | 8/2007 | Demas et al. | 386/68 |
| 7,386,514 | B2 * | 6/2008 | Major et al. | 705/51 |
| 2007/0283390 | A1 * | 12/2007 | Gordon et al. | 725/43 |

* cited by examiner

*Primary Examiner*—Christopher Kelley
*Assistant Examiner*—Charles N Hicks
(74) *Attorney, Agent, or Firm*—Patterson & Sheridan, LLP

(57) ABSTRACT

Multicast groups provide a mechanism to deliver simultaneous media content to a plurality of users. In streaming media systems, such as audio and video systems, each multicast recipient simultaneously receives similar content. Accordingly, each recipient must initiate transmission at the same time. A data communications device delivers multiple media streams of similar content to each of a plurality of users by converging a set of media streams and merging the converged streams onto a single stream for simultaneous delivery to each of the plurality of users from a single media stream resource. A convergence processor identifies a set of streams carrying similar content in a slightly time-shifted manner with respect to the other streams. The convergence processor filters certain streams to augment the streams to converge at a particular point, at which time the streams align respect to media content therein, and merge onto a multicast stream for the duration.

33 Claims, 7 Drawing Sheets

CONVERGENCE PROCESSOR FOR MEDIA STREAMS

BACKGROUND OF THE INVENTION

Modern computer networks are capable of delivering ever-increasing quantities of multimedia data to end-user recipients. In a conventional data communications network system, a media content provider delivers real-time audio and video images in a continuous sequence of packets called a media stream, or so-called streaming audio and video.

Conventional media providers employ the existing conventional network infrastructure, including TELOPS POTS lines, coaxial lines carrying cable TV signals, fiber optic lines, high-volume trunks and other interconnections supporting Internet and other related networks for transmitting media content. Consumer demand for media content services, such as streaming audio and video services, often drives network bandwidth capacity of the conventional infrastructure to its limit. Accordingly, conventional media content providers employ optimizing techniques such as compression, multiplexing, and deployment of new and additional hardware capable of increased throughput, and driven by processors at higher and higher frequencies (speeds).

One such optimizing technique is the use of multicast streams operable to deliver a single streaming audio or video content source to a plurality, or set, of recipients called a multicast group. In a conventional multicast stream, recipients elect to join a multicast group corresponding to the stream. The routers or other intermediary devices in the network propagate the membership of such a multicast group including each of the recipients to which the multicast stream is to be delivered across the network. Conventional Internet Protocol (IP) methods propagate packets in the stream to the multicast group according to a known protocol outlined by the Internet Engineering Task Force (IETF) in RFC 1075: Distance Vector Multicast Routing Protocol (DVMRP), and in RFC 3376: Internet Group Management Protocol (IGMP), and others, as is known to those skilled in the art.

Such a conventional media provider, therefore, establishes a set of recipients of the particular media content source as a multicast group, according to the known multicast protocol. The media content provider transmits a single multicast stream, therefore requiring transmission resources only for the individual multicast stream, rather than for allocating separate transmission resources for individual streams from the content provider to each of the plurality of users included in the multicast group. In this manner, a single stream emanates from the media content provider for multicast transmission to each of the multicast group recipients.

Conventional media content providers typically receive revenue from such streaming media on a fee-for-service is basis, such as via a so-called pay-per-view broadcast. Conventional multicast groups, therefore, provide a vehicle to maximize service delivery, and therefore the revenue, from each of multiple recipients, while allocating only a single transmission stream resource, therefore freeing up other transmission stream resources for other recipients.

SUMMARY

Unfortunately, there are problems associated with delivering media streams to each of multiple users, as described above, because in such a conventional multicast group, each recipient receives the multicast media stream simultaneously. Accordingly, individual recipients are bound by the delivery schedule set by the media content provider. Individual recipients are unable to commence and/or pause the media stream at will. In such a conventional multicast media stream, therefore, a latecomer recipient to a pay-per-view movie, for example, must join the movie in progress at the current point in the already transmitting media stream. Typically, therefore, the media provider must allocate a separate media stream channel to deliver a media stream to each recipient in order to provide a true demand-based service, for example.

The conventional on-demand broadcast systems, therefore, allocate separate stream resources, or stream channels, to each user receiving the media stream. The system allocates unicast point-to-point communication links to each recipient, even if the recipient is receiving similar content, which is shifted only slightly in time from another recipient. Since the multiple transmission streams are not exactly aligned, a multicast group/stream arrangement is inapplicable. Accordingly, each user consumes a dedicated stream channel for the duration of the transmission albeit being only slightly time-shifted from another user receiving the same sequence.

It would be beneficial, therefore, to provide a data communications device operable to edit, or filter, individual media streams of a set of similar streams via insertion and deletion of frames, such that the streams become aligned with, or converge with, other streams having similar content. The aligned streams, which are then carrying duplicate streams of packets, are able to merge together into a single common multicast stream to all merged recipients. Each recipient then receives the multicast stream, thereby releasing each recipient's dedicated stream channel in favor of the common multicast stream channel, such that the data communications device is able to allocate the now idle stream channel resources, formerly transmitting recipient-specific streams, to other needs, such as new incoming requests for on-demand streams.

The present invention substantially overcomes the problems of transmitting a multiplicity of media streams having similar content to each of a plurality of users by converging a set of media streams and merging the converged streams onto a single stream for simultaneous delivery to each of the plurality of users from a single media stream provider. A plurality of users, each requesting the same media content but at differing start times, begin receiving a user-specific stream from the media provider. The convergence processor identifies a set of streams which carry similar content, but at in a slightly time-shifted manner with respect to the other streams. The convergence filter enhances, or filters, certain streams in the set to augment, or effectively "speed up" the streams to converge at a particular point, at which time the streams align, or mirror each other with respect to media content therein. Following convergence, the convergence processor merges each of the streams onto the multicast stream which each of the recipients receives for the duration of the media stream transmission. Media stream resources, such as stream channels, deallocate (free up) as the receiving user terminates the unicast transmission and relinquishes the recipient specific stream channel in favor of the converged multicast stream.

For example, in a Video On Demand (VOD) media service, multiple users may request the same feature at approximately the same time. Accordingly, the media provider sets up an individual media stream to each of the requesting recipients. Therefore, each of the recipients consumes a stream channel for their respective stream. User A selects the feature "Feature 1" at 8:23. The media provider allocates a stream channel to user A, and initiates transmission of the media stream. At 8:25, recipient B also selects "Feature 1," and media provider allocates another media stream to recipient B. Further, at 8:26, recipient C selects "Feature 1," and media provider initiates a third media stream channel accordingly.

The convergence processor observes the three streams carrying the similar content Feature 1, and therefore identifies the three streams as a convergence set. Selection as a convergence sets implies that the streams are carrying similar content, and are substantially close in time such that convergence is feasible. The convergence processor identifies the earliest (first begun) media stream A, serving recipient A, as an unaltered convergence stream. The unaltered convergence stream need not be augmented and serves as a baseline for convergence. The media stream B to recipient B, having started two minutes after the stream to recipient A, needs to make up two minutes playing time. Similarly, the media stream to recipient C needs it to make up three minutes over recipient A's start time.

During a convergence segment, such as 15 minutes for example, the convergence processor filters, such as by performing microediting, certain frames in the streams to recipients B and C so that streams to recipients B and C will effectively replay a shorter time interval to "catch up," and will therefore converge, with the media stream to recipient A. The microediting process, described further below, remove frames according to predetermined convergence logic in a manner that is undetectable to the casual observer. Through such edits, over the 15 minutes convergence segment, the convergence filter removes two and three minutes, respectively, from the media streams to recipients B and C. At 15 minutes playing time, for example, the streams converge, and the convergence processor merges the media streams to recipients B and C to the same stream channel delivering media content to recipient A. Following merging of the streams, that stream channels for recipients B and C free up for other users to employ. Each of recipients A, B and C are now receiving a multicast stream of Feature 1 via the stream channel initially corresponding to recipient A alone. It should be noted that alignment, as employed herein, refers to transmitting both the unaltered and the enhanced streams until both are at the same point i.e. displaying the same frames simultaneously, in the video example above. Merging refers to switching one of the aligned recipients to receive from the same source as the other recipient(s), and converging refers collectively to aligning and merging.

In such a network for delivering media content to a plurality of recipients, the converging content provider transmits and switches media streams to each of the plurality of recipients. In such a network, also called a content delivery network, the content provider organizes the media content such that the content provider selectively directs, or switches, an emanating media stream to one or multiple recipients. The media content provider, in switching a recipient from one stream to an alternate stream, terminates a current stream to a recipient while switching the alternate stream to that recipient. The media streams, therefore, effectively merge when a stream that the media provider has converged (the enhanced stream) terminates in favor of the alternate stream (the unaltered stream) such that the user undetectably begins receiving the alternate stream in lieu of the converged, enhanced stream.

Such methods for merging media streams are further disclosed in copending U.S. patent application Ser. No. 10/185, 589, filed Jun. 28, 2002, entitled "Methods and Apparatus for Transmitting Media Programs", and copending U.S. patent application Ser. No. 10/108,539, filed Mar. 28, 2002, entitled "System and Method for Distribution of Content Over a Network", both assigned to the assignee of the present application and both incorporated herein by reference in entirety.

The converging media provider augments the converging media stream to cause the apparent time shifting, in particular arrangements, by selective frame removal, or so called "microediting" of the media stream. Such microediting serves to remove frames and sequences of frames according to a calculated mechanism, or convergence logic, such that frame removals are undetectable and loss of substantive content is minimal. The converging media provider is operable to perform such microediting according to a variety of methods, discussed further below. One such method is disclosed by Prime Image, Inc., of San Jose, Calif., which commercially markets a product called the "Digital Time Machine" (www.primeimageinc.com). Another method for manipulating media streams is disclosed by Cakewalk, of Boston, Mass., which markets "Sonar 2.2" (www.cakewalk.com).

In further detail, the converging media provider device of the invention provides a method for delivering converging media to first and second recipients by delivering a first media stream at a first delivery rate to a first end user display device, such as a video monitor, and delivering a second media stream at a second delivery rate to a second recipient display device. The convergence device has a convergence filter which applies convergence logic to the second media stream, wherein the convergence logic causes the second media stream to enhance the second media stream and transmit frames at an augmented rate and converge to a convergence threshold in the first media stream, at which point the streams are aligned in time and are delivering duplicate content. The device then continues delivering the first media stream to both the first recipient device and to the second recipient device after applying the convergence logic to the second media stream and merging the two converged (aligned) streams. In this manner, the convergence device converges media streams starting at offsets within predetermined limits by microediting, and therefore shortening, the elapsed playback duration of the later starting stream such that the media streams align in time and merge into a single multicast stream satisfies all recipients.

In a particular configuration, the point at which the streams become aligned occurs at a point called a convergence threshold. The convergence threshold, therefore, is the point at which the convergence processor is delivering the first media stream to both the first recipient and the second recipient. Accordingly, the convergence threshold is defined by a location at which the first media stream is aligned with the second media stream. At the convergence threshold, the converging media provider begins transmitting the same multicast stream to both recipients because the convergence logic processing aligns the first and second streams in time such that they are concurrent duplicates of each other.

Applying the convergence logic further comprises processing at least one of the first and second media streams, to yield a filtered, enhanced media stream, the enhanced media stream comprising an altered, or abridged version substantially similar to the corresponding media stream by selective editing of frames in the media sequence. Alternatively, implementations of the invention may pad streams with frames or other material which actually lengthens certain streams rather than shortening others in computing the enhanced media stream.

The convergence logic typically enhances (filters) the media stream by selectively removing frames which are substantially undetectable to the casual observer. Such frames may be, for example, static (still) images of an unmoving or slightly panned image, or frames differing insubstantially from the immediately preceding or following frames. The convergence filter may employ other such enhancing and/or compression schemes, as discussed above. The selective enhancing by the convergence filter produces, therefore, a different transmission rate for the second media stream relative to the first media stream for corresponding portions of the media stream. "Enhancing," as used herein, refers to the stream modifications, such as microediting and frame insertion and deletion, made to the media stream in a manner intended to be undetectable by the user and for the purpose of converging a plurality of media streams to a convergence threshold, as described herein.

Such enhancing, therefore, provides for effective time shortening of the resultant media sequence in contrast to the corresponding unaltered, or unfiltered, media sequence. Following the convergence threshold, after the convergence portion of the media streams, both the first and second media streams include a duplicate segment, the duplicate segments being identical. Once the convergence filter aligns the multiple streams, therefore, the remainder of the streams are duplicates of each other.

The convergence filter performs the convergence processing according to the convergence logic, as indicated above. In a particular embodiment, the convergence logic is predetermined and applying the convergence logic further comprises enhancing the second media stream according to a predetermined convergence segment, the convergence segment defining a predetermined time until the convergence threshold. In alternate configurations, the convergence filter enhances the media stream in realtime to produce the enhanced version. The convergence filter, therefore, determines which frames to add or remove and at which location in the media stream. The convergence processor determines which enhanced version to direct to a particular recipient and when to merge multiple streams into a single converged stream, i.e. when the streams align. The convergence processor stores the first and second media streams in a media content repository, in which the media content repository (database) is responsive to the convergence processor for retrieving the media streams. At a successive time, the media provider receives a recipient request and, retrieves, in response to the recipient request, the media streams for delivery to the requesting recipients. The convergence processor selectively determines which of the multiple media streams to deliver to each of the requesting recipients at a corresponding media start time, depending on the timing of the request by the respective recipients.

The convergence processor begins merging, at the convergence threshold, the second media stream from a second stream channel onto a communication path from a first stream channel of the first media stream to the first recipient. The convergence processor terminates the second media stream from the second media channel to the second recipient, and reallocates the second media channel, such that the merging of the second media stream from the second stream channel to the first stream channel is substantially undetectable to the second recipient. In this manner, the convergence processor converges, or speeds up, the second, later starting recipient is to the convergence point, and, once convergence, or alignment occurs, the convergence processor merges or "switches over" the second recipient to the first stream channel to receive the same stream simultaneously. Such merging, in a particular configuration, occurs as described in the copending U.S. patent application Ser. Nos. 10/185,589 and 10/108,539, discussed above. Alternate merging mechanisms may be provided.

In a particular configuration, the convergence processor employs multicast groups as disclosed above (IETF RFC 3376: Internet Group Management Protocol, and others) for delivering the first and second media streams, including defining, at an intermediate data communications device, a set of recipient groups corresponding to at least the first and second recipients, each of the first and second recipients defined as a member of one of the set of recipient groups, and redefining the second recipient as a member of the multicast recipient group corresponding to the first recipient. The recipients join the multicast group after the convergence processor converges and aligns the respective multicast stream serving the recipient with the multicast stream such that the convergence processor is able to undetectably switch the user to the multicast stream. Therefore, a latecomer recipient joins a multicast group lagging the first recipient's multicast group, and the converging media provider converges, or switches, the user from the latecomer multicast group to the unaltered multicast group following alignment.

The features of the invention, as described above, may be employed in systems, data communications devices and methods, as well as other computer-related components such as those of Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
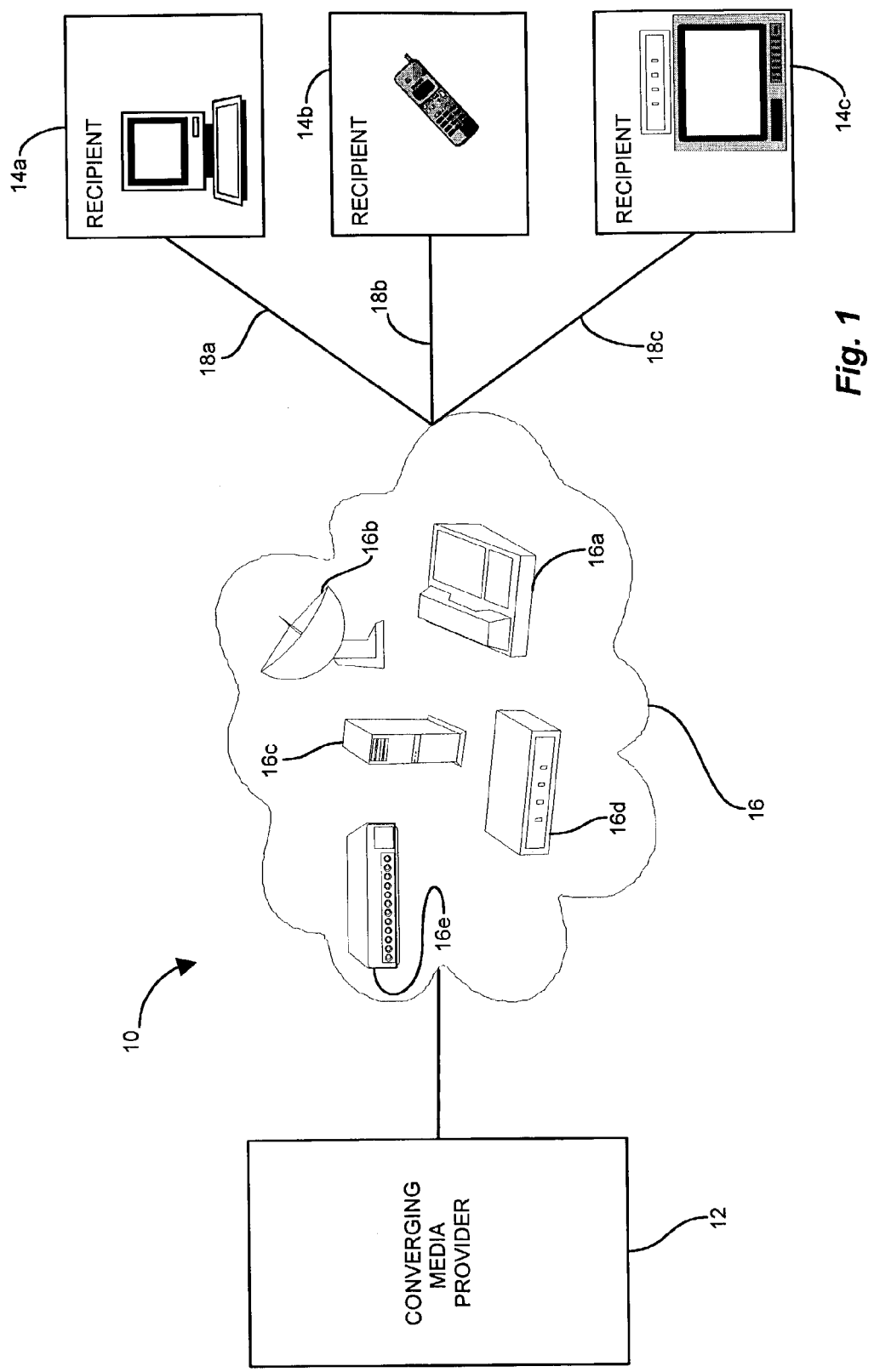
FIG. 1 is a context diagram of a communications system which is suitable for use with the present invention employing a convergence media provider device as defined herein.

Embodiments of the invention provide for managing multiple media streams of similar content to each of a plurality of users by converging a set of media streams and merging the converged streams onto a single multicast stream for simultaneous delivery to each of the plurality of users from a single media stream provider. A plurality of users, each requesting the same media content but at differing start times, begin receiving a user specific stream from the converging media provider. A convergence processor in the converging media provider identifies a set of streams (multicast or point-to-point), each of which are carrying similar content, either identically synchronized or in a slightly time-shifted manner with respect to the other streams. A convergence filter in the converging media provider filters certain streams in the set to augment, or effectively "speed up" the streams to converge at a particular point, at which time the streams align, or mirror each other with respect to the media content therein. Following convergence, the convergence processor merges each of the streams onto a multicast stream which each of the recipients receives for the duration of the media stream transmission. Media stream resources, such as stream channels, therefore, are freed for possible reuse as the receiving user terminates the unicast transmission in favor of the converged multicast stream.

The converging media provider, therefore, attempts to group or consolidate requests for the same media content from a plurality of media recipients (users). The media provider may receive such a group of requests, for example, within several minutes of each other. The first such request triggers the stream which the convergence processor does not filter (unaltered), which the media provider begins broadcasting to the recipient.

The converging media provider may group several requests received within an attention window, 30 seconds for example, during which a recipient receives "in-progress" feedback to avoid having the user decline the broadcast due to inactivity. The media provider transmits the remaining streams, from later requesting recipients, which the media provider starts after the unaltered stream and lagging by several minutes. The lagging streams may begin converging immediately, or may transmit a start segment initially to attempt to focus and retain the attention of the recipient. The start segment is the same as the corresponding portion of the unaltered segment, albeit lagging, and avoids a user discontinuing the transmission as a result of overly aggressive convergence enhancing causing noticeable alterations in the media stream.

Both the in-progress feedback message, and to a slightly lesser extent the start segment, attempt to approximate the attention window of the average user and maintain the focus of the recipient to allow the convergence operation to operate. The attention window operates to achieve a similar effect as the converging, altered streams by switching streams to serve multiple recipients from a single stream channel. However, the effectiveness of such an attention window is limited by human factors such as the willingness of the recipient to wait for a request to be satisfied. In other words, the in-progress message and the start segment are intended to grab and maintain the attention of the recipient until the recipient decides to view the entire stream, rather than selecting an alternate channel.

The lagging streams converge with the unaltered stream, as disclosed further below, until alignment occurs with the unaltered stream. At the point of alignment, or convergence threshold, the later running streams are no longer lagging, and merge, or "cut over" to the multicast stream to receive the remainder of the unaltered version as a multicast transmission, called the duplicate segment, since enhancing need not occur after the convergence threshold.

FIG. 1 is a context diagram of a communications system 10 which is suitable for use with the present invention employing a converging media provider device 12 as defined herein. Referring to FIG. 1, the system includes a media provider 12, a public access network 16 such as the Internet, a plurality of recipients 14a-14c and transmission lines 18a-18c.

The media provider 12 connects to a public access network such as the Internet 16 for delivering media content to a plurality of recipients 14a-14c (14n generally). The network 16 includes a variety of mediums for delivering straining media content to the recipients 14n, including TELCO (telephone company) lines 16a, satellite 16b, servers 16c, modems 16e, routers 16e and other suitable communications equipment. Each of the recipients 14n connects to each of the recipients 14a-14c by the communications lines 18a-18c respectively. Each of the recipients 14n receives the media stream via any suitable output device such as PC 14a, handheld mobile device 14b, or television set-top box 14c.

In operation, each of the recipients 14n issues a request for media services to the converging media provider 12. Such media services include, by way of example only, video-on-demand, pay-per-view (PPV), voice over IP (VOIP), broadband Internet connections, and others. Such a request may be initiated directly from the user, or may be initiated by a program or automated trigger detecting a need for an alternate stream. In response to a request, the media provider 12 delivers the requested media content via the network 16 to the corresponding recipients 14n. In a particular configuration, described further below, convergable media streams converge, or consolidate, similar media content from the media provider 12 to each of a plurality of recipients 14n.

Figure 2:
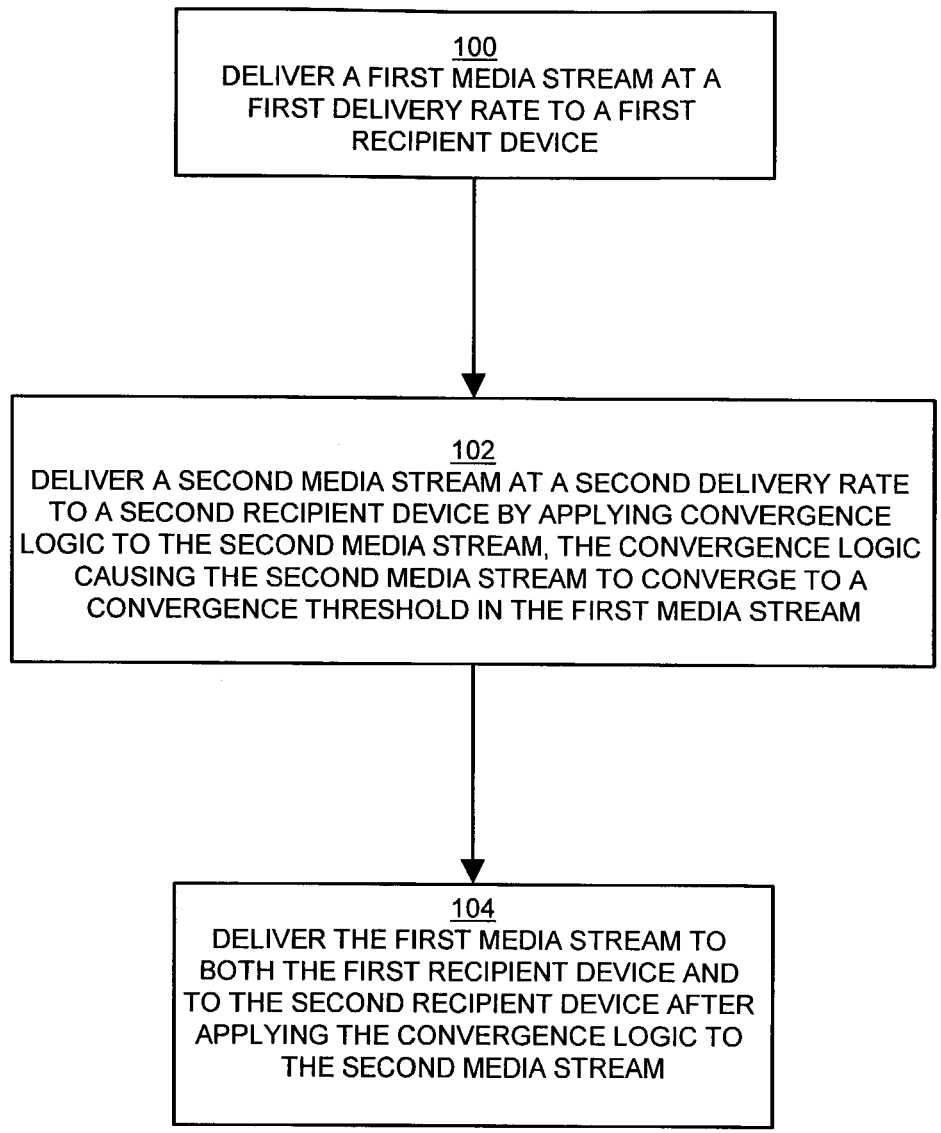
FIG. 2 is a flowchart of converging media streams in a converging media provider device as defined herein

FIG. 2 is a flowchart of converging media streams in a converging media provider 12 as defined herein. Referring to FIG. 2 and also to FIG. 1, at step 100, the media provider 12 delivers a first media stream at a first delivery rate to a first recipient device 14n. The process of converging media streams typically results in the media provider 12 transmitting a particular media stream without modifications, or unaltered, and enhancing other media streams to align with the unaltered media stream. At step 102, the media provider begins delivering a second media stream at a second delivery rate to a second recipient device 14n. The converging media provider 12 applies convergence logic to the second media stream, the convergence logic performing enhancing micro-edits which cause the second media stream to converge to a convergence threshold in the first media stream. Accordingly, the media provider 12 begins delivering a second media stream of similar content, but at a slightly accelerated rate due to the enhancing edits. The convergence logic, described further below, specifies the enhancing process, typically removal of selected frames, such that the media provider 12 transmits a shorter duration of stream content in the enhanced stream then in the corresponding portion of the unaltered stream. In this manner, the enhanced stream will attain the same point in the playback sequence, such as a movie, as the unaltered stream, because the enhanced media stream requires less time to playback corresponding segments of the media content. This point is the convergence threshold, and is defined by alignment of the first media stream and the second media stream, such that both media streams transmit the same sequence of information at the same time. At step 104, the media provider 12 delivers the first media stream to both the first recipient device 14n and the second recipient device 14n after applying the convergence logic to the second media stream. Following the convergence threshold, the media provider 12 has, in effect, caught up the enhanced media stream with the unaltered media stream, and therefore provides a single media stream to both the first and second recipients. The media provider 12 transitions, or merges, the second recipient from the second media stream to the first media stream such that a second media stream channel, which had been transmitting the second media stream, becomes available for other purposes, and the first media stream becomes a multicast stream. At this point, for the duration of the media content transmission, the first recipient device and the second recipient device are both receiving the first media stream as a multicast stream.

Figure 3:
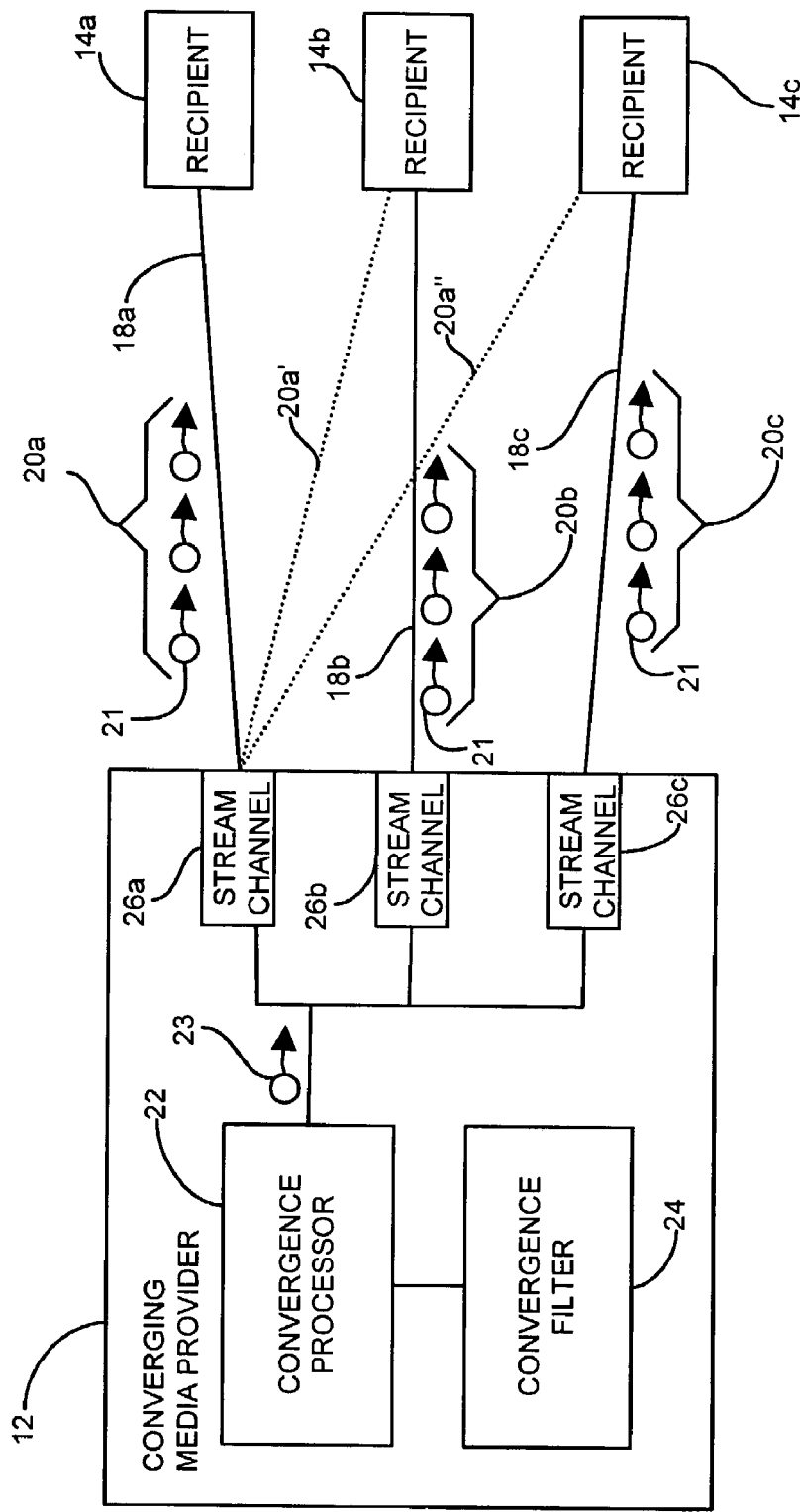
FIG. 3 is a block diagram of the converging media provider device employed in the communications system of FIG. 1.

FIG. 3 is a block diagram of the convergence processing device 12 employed in the communications system of FIG. 1. Referring to FIG. 3, the media provider 12 delivers media streams 20a-20c (20n generally) to the plurality of recipients 14a-14c by way of stream channels 26a-26c (26n generally). Each of the media streams 20a-20c is a series of packets 21 including the transmitted information. Each of the recipients 14a-14c receives a corresponding stream 20a-20c via a dedicated respective stream channel 26a-26c. However, since each of the recipients 14n begins receiving the transmission stream 20n at different times, each of the streams 20a-20c, although similar in content, do not yet align with respect to time. Converging the streams 20a-20c aligns the streams with respect to both content and time, such that the media provider 12 transmits a single multicast stream which each recipient 14a-14c receives. Following convergence, each recipient 14a-14c, in this example, receives the multicast stream 20a from the stream channel 26a as shown by dotted lines 20a' and 20a." Stream channels 26b and 26c deallocate for transmission to other users while stream channel 26a maintains the multicast stream to each of recipients 14a-14c.

As indicated above, the media provider 12 initiates the media stream 20a-20c in response to a request from each of the recipients 14a-14c. The convergence processor 22 delivers the media content to each of the stream channels 26a-26c for transmission to the corresponding recipients 14a-14c. The convergence filter 24 filters media content, described further below, in response to the convergence processor 22, to allow the media streams 20b and 20c to converge with stream 20a, that is, to effectively shorten the media streams 20b and 20c via enhancing such that they align with stream 20a. In the example shown, in which the media streams 20a-20c are video-on-demand, enhancing of streams 20b and 20c occurs via a process known as microediting. The microediting selectively removes frames from the media content. The microediting, therefore, allows a shorter playback time for the microedited media streams 20b and 20c relative to the unaltered media stream 20a.

The convergence processor 22 delivers frames for each of the media streams 20a-20c, such that, in the example shown, the media streams 20b and 20c converge, or align, with the unaltered stream 20a. In this example, the convergence processor 22 selects stream 20a as the unaltered stream, and effectively shortens streams 20b and 20c via the microediting, however the convergence filter 24 may also insert frames 23, or alternatively carry out other editing operations, to slowdown a particular stream 20n, rather than speedup, in order to converge a plurality of streams 20n. For example, the convergence stream need not be the earliest begun stream and an earlier stream may be, in effect, slowed to converge.

Figure 4A:
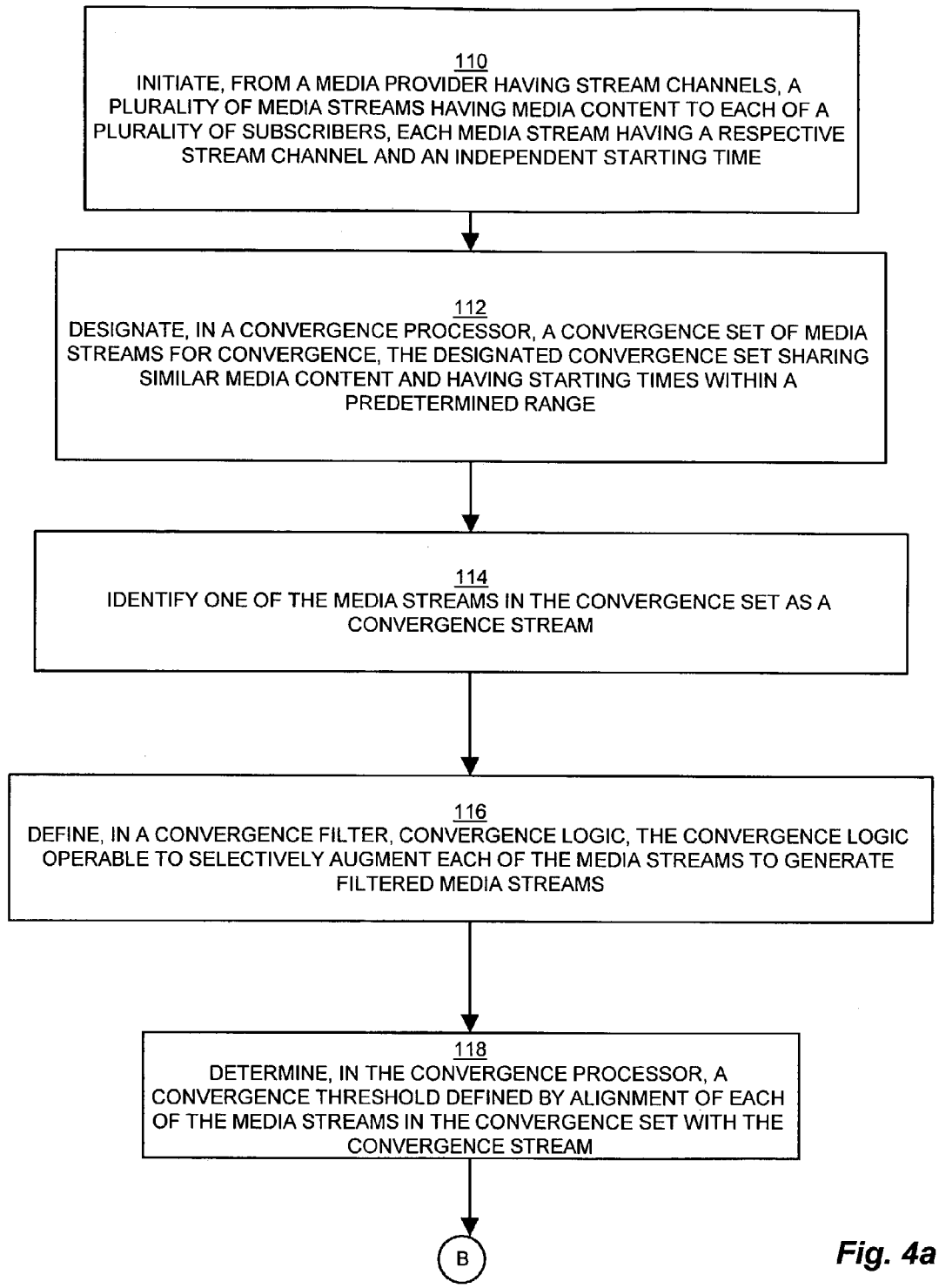
FIGS. 4a and 4b are a flowchart of convergence processing of multiple media streams using the converging media provider device of FIG. 3.
Figure 4B:
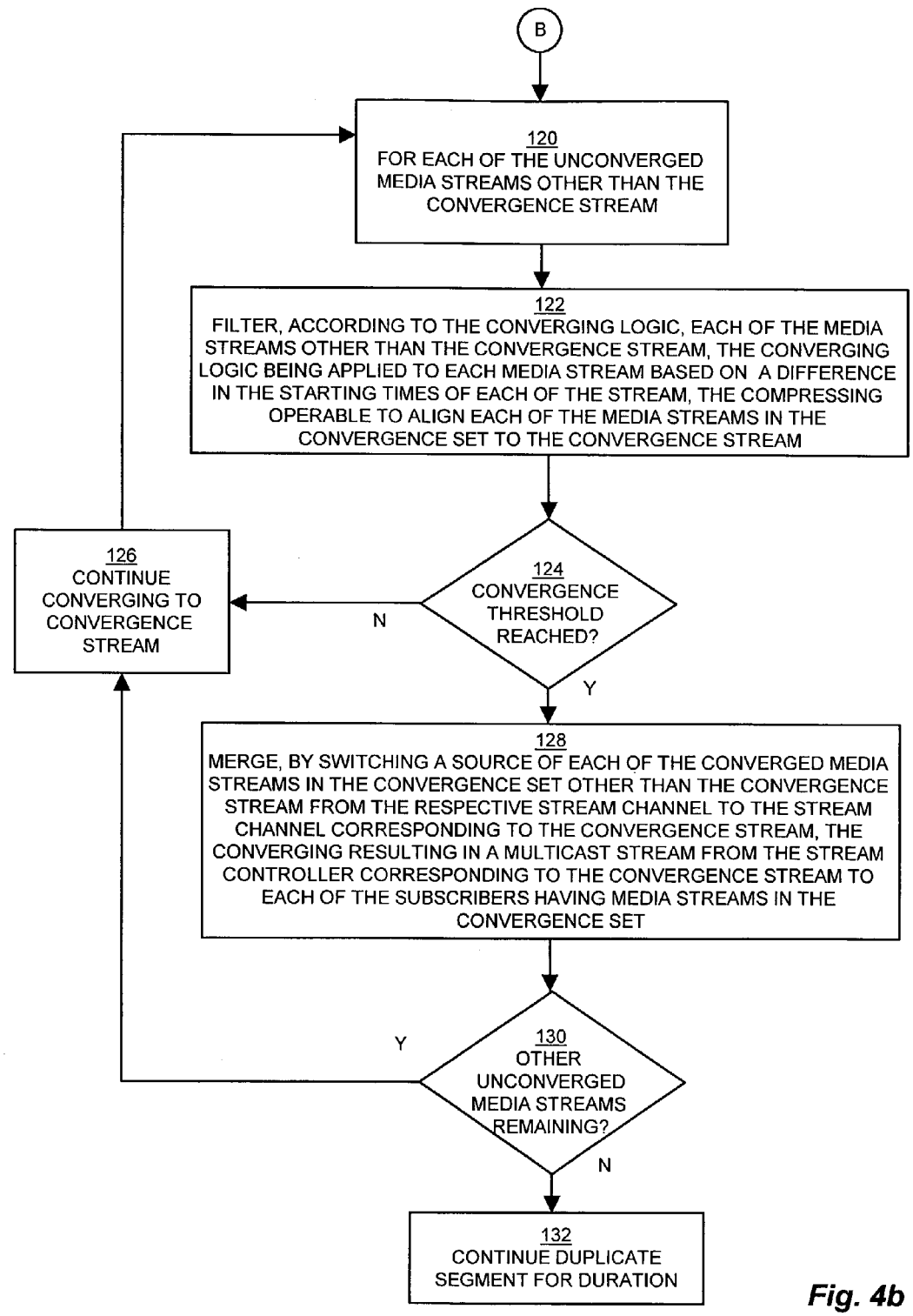

FIGS. 4a and 4b depict a flowchart of convergence processing of multiple media streams using the convergence processing device of FIG. 3. Referring to FIGS. 4a, 4b, and 3, a plurality of recipient subscribers 14a-14c request a media content delivery containing similar media content. In step 110, the media provider 12 initiates, from a plurality of stream channels 26a-26c, a plurality of media streams 20a-20c having similar media content to each of a plurality of subscribers 14a-14c, via transmission lines 18a-18c, each media stream 20a-20c having a respective stream channel 26a-26n and an independent starting time. A typical example of one such transmission is a video-on-demand service in which a set of recipients order the same feature at different starting times within a predetermined range called a convergable window (39, discussed further in FIG. 5 below).

The convergable window 39 is a threshold maximum interval of time in which the convergence filter 24 is operable to filter out frames in a manner substantially undetectable to the user. For example, an enhanced media stream is adaptable to undetectably filter 3 minutes off the first 20 minutes of the unaltered media stream, and 5 minutes off the first 30 minutes. The convergable window 39 is 5 minutes in this example, because after 5 minutes the microediting process is unable to further filter the media stream 20a in a substantially undetectable manner. Further, while the enhancing may be performed up to the duration of the media stream 20a transmission, converging at the end of the unaltered stream 20a does not deallocate any stream channels because the converging recipient 14n remains bound to the converging stream 20n until the streams converge. The convergable window 39, therefore, defines a time after which the benefit gained by deallocation of the stream channel 26n is outweighed by the resources required to perform convergence.

At step 112, the convergence processor 22 designates a convergence set 20a-20c of media streams for convergence, the designated convergence set 20a-20c sharing similar media content and having starting times within the convergable window 39. The convergence set is the set of media streams 20a-20c which the convergence processor 22 aligns such that merging is feasible. At step 114, the convergence processor 22 identifies one of the media streams 20a-20c in the convergence set as a convergence stream 20a. In a particular embodiment the convergence stream is the earliest-begun stream 20a in the convergence set.

At step 116 the convergence filter 24 employs convergence logic operable to selectively alter each of the media streams to generate enhanced media streams 20b, 20c, including the corresponding enhancing. Note that the enhancing may take place in real-time, selectively editing frames as the media provider transmits the media stream 20, or, in alternate configurations, the media provider 12 stores the media stream 20n after applying enhancing.

At step 118, the convergence processor 22 determines a convergence threshold (FIG. 5, 37, described further below), by defining a point of alignment of each of the media streams 20n in the convergence set with the convergence stream 20a. The convergence threshold 37, therefore, is the point at which enhancing completes compensating for the delayed start time and aligns each of the media streams 20b-20c in the convergence set with the convergence stream. Accordingly, following the convergence threshold, all of the streams 20a-20c in the convergence set display media at the same position (i.e. same point in the sequence) in the media streams 20a-20c. In particular embodiments, as with the enhancing described above, the convergence processor 22 computes the convergence threshold 37 in advance of playback and stores it with the media stream 18a-18c. Alternatively, in real-time configurations, the convergence processor 22 determines alignment of the streams 20a-20c during playback.

Once the media provider 12 begins designating a convergence set, the media provider 12 transmits, or delivers, each of the media streams 20a-20c to the requesting recipients 14a-14c. Note that the media provider 12 may add recipients 14n to the convergence set, within the bounds and time limits of the convergable window 39. Referring now to FIG. 4b, as shown at step 120, the media provider establishes an additional stream channel 26b, 26c for each of the recipients (14b, 14c) other than the convergence stream 18a. At step 122, the convergence processor 22 filters, according to the convergence filter 24, each of the media streams 20b-20c other than the convergence stream 20a, in which the convergence filter 24 applies the convergence logic to each media stream 20 based on the difference in the starting times of each of the streams 20n, the enhancing, or compressing, operable to align each of the media streams 20n in the convergence set 20a-20c with the convergence stream 20a.

At step 124, the convergence processor 22 performs a check to determine if the convergence processor 22 transmissions reach the convergence threshold 37 of the media streams 20b, 20c. If the convergence processor 22 has not transmitted beyond the convergence threshold, then the convergence processor 22 continues enhancing the media streams 20b, 20c, and, at step 126, converging continues. If convergence is complete and the convergence processor 22 transmits beyond the convergence threshold 37, at step 128 the convergence processor merges the converging media streams 20*b*, 20*c*.

The convergence processor merges the converging media streams 20*b*, 20*c* by switching a source stream channel 26*b*, 26*c* of each of the converged media streams 20*b*, 20*c* in the convergence set other than the convergence stream 20*a* from the respective stream channel to the stream channel 26*a* corresponding to the convergence stream 20*a*, the converging resulting in a multicast stream 20*a*, 20*a*' and 20*a*" from the stream channel 26*a* corresponding to the convergence stream 20*a* to each of the subscribers 14*b* and 14*c* having media streams in the convergence set 20*b* and 20*c*.

Figure 5:
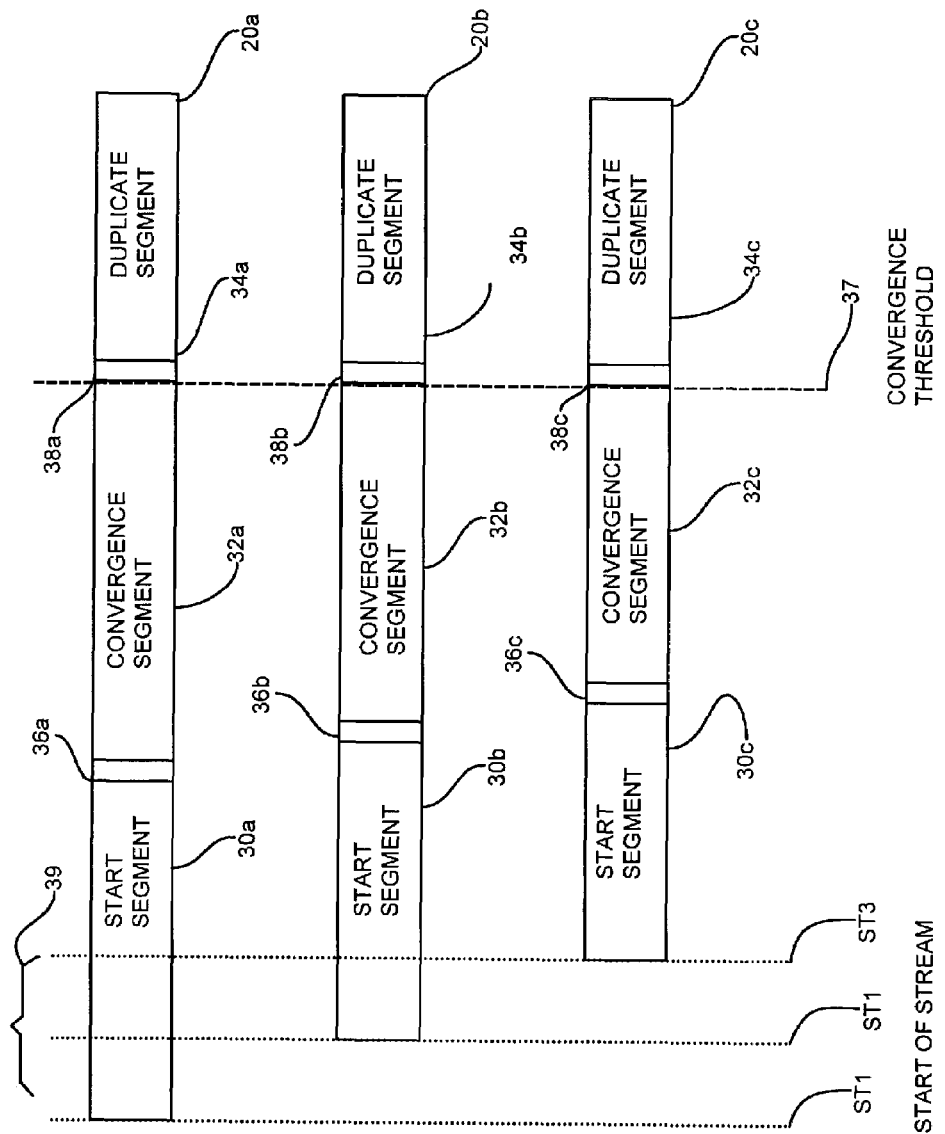
FIG. 5 shows the media streams employed for convergence processing in the converging media provider device of FIG. 3.

FIG. 5 shows the media streams employed for convergence processing in the convergence processing device of FIG. 3. Referring to FIG. 5, and also to FIG. 3, the media streams 20*a*-20*c* are shown in more detail, including component segments 30*a*-30*c*, 32*a*-32*c* and 34*a*-34*c* described further below. Each of the segments 30*n*, 32*n* and 34*n*, corresponds to a sequence of frames 23 in the respective media stream 20*a*-20*c*. Each of the streams 20*a*-20*c* commences at a corresponding start time ST1, ST2, and ST3. For each stream 20*n*, there are three segments: start segments 30*a*-30*c* (30*n* generally), a convergence segment 32*a*-30*c* (32*n* generally) and the duplicate segment 34*a*-34*c* (34*n* generally). During the start segments 30*a*-30*c*, the converging media provider 12 transmits a dedicated stream to each of the recipients 14*a*-14*c*, respectively, over the dedicated stream channel 26*a*-26*c*. During the start segments 30*a*-30*c* the media provider 12 transmits unaltered media streams 20*n* to avoid providing an incentive to the recipients 14 to decline the transmission. The media streams 20*a*-20*c* contain a convergence begin marker 36*a*-36*c*, such as a tag value in a packet 21, to mark the convergence point for transition from the start segments 30*a*-30*c* to the convergence segment 32*a*-32*n*. Alternative configurations, however, may track the transition by timing, byte count, or other suitable methods to denote the convergence begin marker (point) 36*a*-36*c*.

At the convergence begin marker 36*a*-36*c*, the convergence processor 22 begins to converge the streams 20*a*-20*c* by transmitting an enhanced media stream. During the convergence segment 32*n*, the convergence processor 22 both filters and delivers converging media streams 20*n* according to convergence logic, described further below, to provide convergence of the streams 20*a*-20*c*.

The convergence segment 32*n* is the enhanced portion of the media stream 20*n*. Accordingly, as shown in FIG. 5, the elapsed time of the convergence segment 32*n* varies depending on the start time ST1-ST3. A convergence complete marker 38*a*-38*c* defines the point at which the media streams 20*a*-20*c* align, and therefore converge with each other. Note that, similar to the convergence start marker 36*a*-36*c*, the end of the convergence segments 32*a*-32*c* may be marked with a convergence complete marker 38*a*-38*c*, or may be detected by other means. Following the convergence segments 32*a*-32*c*, the duplicate segment 34*a*-34*c* is shown. The duplicate segments 34*a*-34*c* indicate alignment of each of the respective streams 20*a*-20*c*, and therefore define the point at which the convergence processor 22 delivers a single multicast stream 20*a* to each of the multiple recipients.

Figure 6:
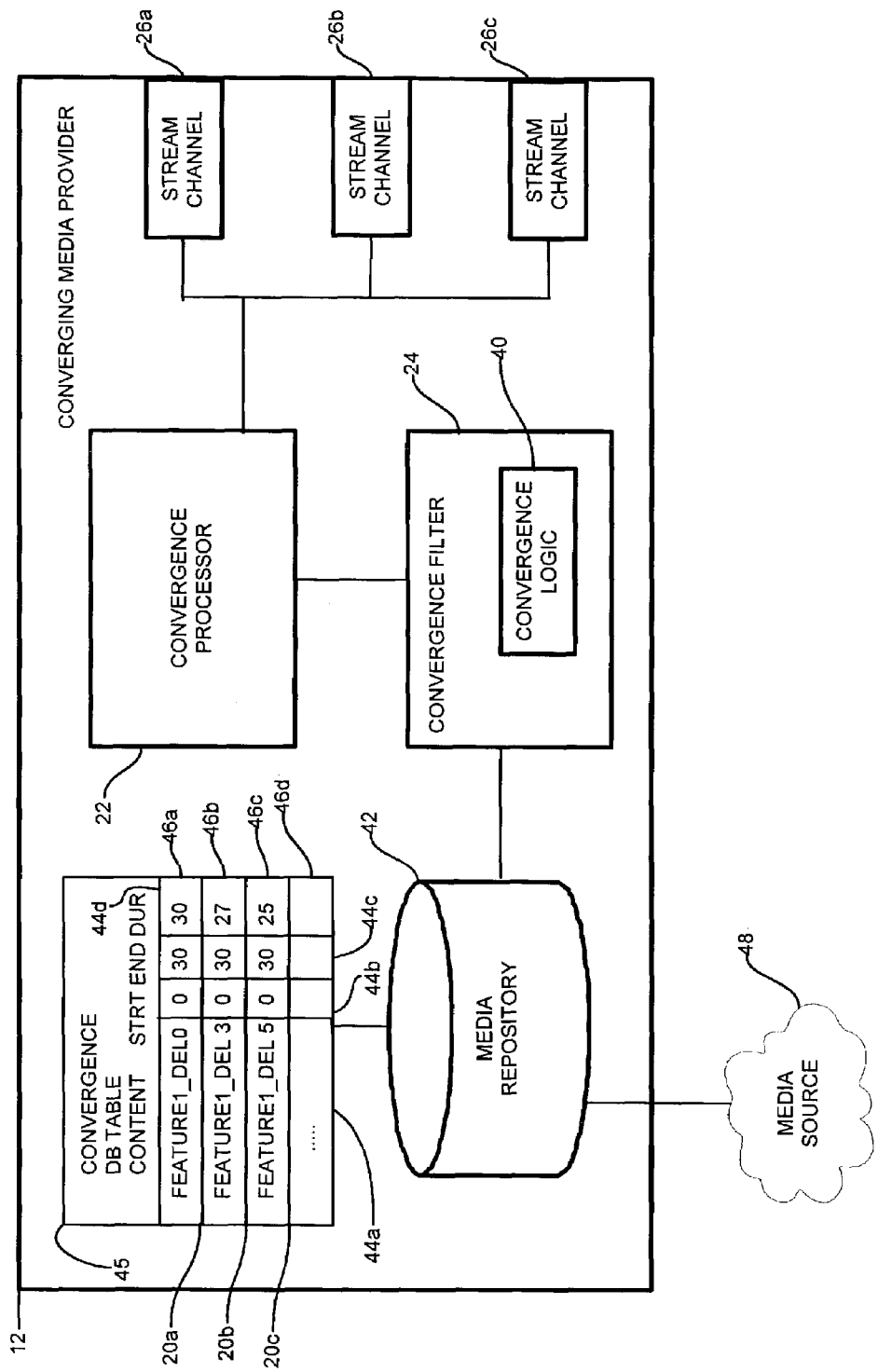
FIG. 6 is a block diagram showing the converging media provider device of FIG. 3 in more detail.

FIG. 6 is a block diagram showing the converging media provider device 12 of FIG. 3 in more detail. Referring to FIG. 6, the converging media provider device 12 includes a media repository 42 and a convergence database table 45. The convergence database table 45 includes a plurality of convergence entries 46*a*-46*d*. The media repository 42 further connects to a media source 48 and also to the convergence filter 24 having convergence logic 40.

The media repository 42 is upgraded to store multiple media versions in both enhanced and unaltered forms. The media source 48 transmits, for example, unaltered (unaltered) media sequences, such as feature films for the video on demand service and audio soundtracks for soundtrack downloads (not shown) to the media repository 42. Alternate configurations may transmit other types of media material for streaming transmission. The convergence logic 40 filters media sequences that the convergence filter 24 receives from the media repository 42. The convergence filter 24, as described above, connects to the convergence processor 22, and either transmits media sequences 20*n* following enhancing operations by the convergence logic 40, or returns than to the media repository 42 for storing in the convergence database table 45. As described above, the convergence operations may occur either in realtime, in which the convergence filter 24 employs the convergence logic 40 during actual transmission (playback) for realtime microediting, or alternately, stores the media stream 46*n* following microediting.

The convergence database table 45 stores the media sequences in both enhanced and unaltered forms. Typically, the unaltered form is used as a baseline to which the enhanced versions converge. A plurality of entries 46*a*-46*d* store the media sequences after operations by the convergence filter 24. The convergence processor 22 connects to the plurality of stream channels 26*a*-26*c* for transmission to the recipients 14*n* as described above respect to FIG. 3. The media source 48 connects to the media repository 42 for receiving the media sequences 20*n*. Alternate configurations receive both unaltered (unaltered) and enhanced media sequences 20*n* via the media source 48, for storing directly into the convergence database table 45 in the media repository 42, as in such cases when external sources filter media sequences prior to transmission to the media provider 12.

In a particular embodiment, the convergence database table 45 stores media sequences 20*n* corresponding to several enhancing applications of a particular media sequence. Typically, the convergence logic 40 applies enhancing operations corresponding to enhancing parameters. The enhancing parameters include a start convergence time 44*b* and an end convergence time 44*c*. The start convergence time 44*b* corresponds to the convergence begin marker (36*n*, FIG. 5) and the end convergence time corresponds to the convergence complete marker 38*n* and also to the convergence threshold 37 of FIG. 5. The table 45 also includes a convergence duration field 44*d* indicative of the amount of time the enhancing in the particular version corresponds to in the unaltered version. For example, a particular converged version may have a convergence segment 32*n* corresponding to 10 minutes of media sequence time of the unaltered version, yet occupying only eight minutes in the enhanced, or converged version, therefore decreasing the playback times by two minutes over the unaltered version.

The convergence database table 45 maintains the plurality of entries 46*a*-46*d* for storing media sequences corresponding to several sets of enhancing parameters. The media provider 12 maintains, in the media repository 42, multiple versions of each media sequence having different enhancing parameters for convergence of start 44*b* and convergence duration 44*d*. The convergence database table 45, therefore, maintains versions of the same media sequence with difference convergence duration 44*d* and times for each version. Further, the convergence filter 24 employs the start convergence field 44*b*, which indicates the timing of the begin convergence marker 36n, to commence convergence at other than the actual start of the media sequence, described further below.

For example, the convergence database table may maintain one version of a feature covering ten minutes of media sequence time in eight minutes of real-time. Another version of the feature covers fifteen minutes of media sequence time in twelve minutes of realtime. As shown in the convergence database table 45, convergence entry 46b, for Feature 1, has a duration 44d of 27 minutes, yet a start parameter 44b of 0 and end parameter 44c of 30, indicating that the convergence starts at 0 minutes into the feature, last 27 minutes in duration, and ends at 30 minutes into the unaltered feature, therefore accumulating three minutes of playback in realtime. Similarly, entry 46b has a start time 44b of 0, an end time 44c of 30 and a duration 44d of 25, indicating that in the first 30 minutes of the feature playback time will occur in 25 minutes of real-time duration, therefore accumulating 5 minutes of playback.

In the above-described scenario, the media stream corresponding to the convergence database table entry 46b is suitable for recipient 14b and commences three minutes after the start of the unaltered version 46a. The media stream corresponding to convergence database table entry 46c is suitable for recipient 14c and commences five minutes after the start of the unaltered version 46a. Other combinations of media sequences and durations for covering ranges of start times will be apparent to those skilled in the art.

In response to requests from the recipients 14n, the convergence processor 22 determines the applicable convergence entry 46n which allows the media stream to converge with another media stream, typically the unaltered stream 46a. The convergence processor 22 reads the frames from the media repository 42 for each of the corresponding media streams 46b, 46c in the present example, and transmits them via the corresponding stream channels 26n to each of the corresponding users 14n.

For example, in the table 44 example shown above, recipient 14a receives Feature 1 according to table entry 46a via a stream channel 26a at 2:00. Recipient 14b receives Feature 1 according to entry 46b at 2:03. Recipients 14c receives Feature 1 according to table entry 46c at 2:05. The convergence threshold 37 for the media streams 20b and 20c is therefore at 2:30, at which point each stream 20b and 20c, read from entry 46b and 46c respectively, will have advanced to a point equivalent with the unaltered version 46a. Conversely, as shown in the convergence database table 44, the media stream 20b corresponding to the entry 46b, having started three minutes late, transmits for only 27 minutes to cover the first 30 minutes of Feature 1. Similarly, the media stream media stream 46c corresponding to table entry 46c transmits for only 25 minutes to cover the first 30 minutes of Feature 1. At the convergence time of 2:30, both of streams 20b and 20c, transmitting from stream channels 26b and 26c respectively, converge such that they align with the media stream emanating from stream channel 26a. Accordingly, recipients 14a, 14b and 14c all receive the single multicast stream emanating from stream channel 26a, and stream channels 26b and 26c are available for reassignment by the media provider 12.

As indicated above, alternate embodiments allow 40 start time field 44b of the enhanced media streams 46n to vary such that the convergence segments occurs in the middle rather than the beginning of the media stream. The start segments 30a-30c of FIG. 5 illustrate the use of a start segment preceding a convergence segments. Since the convergence segment 32b, 32c represents the enhanced transmission in which the convergence filter 24 in effect drops frames during the enhanced sequence, the convergence processor 22 transmits the enhanced media stream 20b, 20c which, although presumably undetectable to the casual observer, may be perceptibly imperfect to a trained or scrutinous viewer. Accordingly, the start segment 30n allows the convergence processor 22 to defer displaying an unaltered media stream at the onset, in the hopes of not dissuading a viewer from remaining attentive to the delivered media stream. The successive convergence segment 32b, 32c, which the convergence processor displays to a viewer which is already familiar with the context may be more likely to dissuade a viewer from terminating the media sequence prematurely.

As indicated above, the convergence logic 40 computes enhancing of the respective media sequences. The enhancing of the media sequences depends upon the start convergence 44b, end convergence 44c and duration 44d parameters for the corresponding media stream 20n. The convergence logic 40 is operable to selectively enhance (microedit), or in the case of a media stream containing video content, to selectively add or remove frames in an undetectable manner. The selective editing may be by any suitable means, particularly with respect to available computing resources in the case of a real-time convergence filter 24 operation. For example, a simple convergence logic configuration may filter, or selectively remove one of every N frames in order to achieve the desire acceleration of the media stream to the convergence, such as one out of every six frames to achieve a speed up of two minutes over a 12 minutes media stream 20n duration.

Other convergence logic 40 mechanisms may be implemented, such as analyzing a static or dynamic component of the media content. For example a long sequence of a landscape topology having little movements may be undetectable in a shortened version, and therefore a viable candidate for enhancing.

In alternate configurations, alternate methods other than the multicast group protocol are operable to deliver a common media stream to multiple recipients following alignment of the individual streams. The multicast group is operable to relieve, after merging the streams to 26a, the dedicated stream channels, 26b and 26c, in the example shown in FIG. 3, from transmitting for the duration of the media streams 20b and 20c, respectively. The convergence processor may also employ other merging and multi-recipient transmission methods.

Those skilled in the art should readily appreciate that the programs and methods for stream convergence processing as defined herein are deliverable to a processing device in many forms, including but not limited to a) information permanently stored on non-writeable storage media such as ROM devices, b) information alterably stored on writeable storage-media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for stream convergence processing has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method, comprising:
controlling a content delivery device to identify a first media stream being delivered to a first set of recipient devices, where the first media stream is providing a content at a delivery rate, and where the content is being displayed at a display rate on the first set of recipient devices;
controlling the content delivery device to identify a second media stream being delivered to a second set of recipient devices, where the second media stream is also providing the content at the delivery rate and where the content is also being displayed at the display rate on the second set of recipient devices;
controlling the content delivery device to identify a time offset between the first media stream and the second media stream;
controlling the content delivery device to converge the time offset between the first media stream and the second media stream by selectively dropping data frames from the second media stream while maintaining the delivery rate unchanged and while maintaining the display rate as unchanged; and
upon determining that the time offset has converged, controlling the content delivery device to terminate delivery of the second media stream to the second set of recipient devices and to commence delivery of the first media stream to the second set of recipient devices.

2. The method of claim 1, comprising increasing the delivery rate for the second media stream by no more than 20%.

3. The method of claim 1, where determining that the time offset has converged comprises determining that the first media stream is aligned with the second media stream.

4. The method of claim 1, where the first media stream is a multicast stream and where the second media stream is a unicast stream.

5. The method of claim 1, where selectively dropping data frames from the second media stream without changing the delivery rate comprises micro-editing one or more data frames whose removal cannot be perceived by a consumer of the second media stream.

6. The method of claim 1, comprising
enhancing the second media stream according to a convergence threshold, that defines a predetermined time until the convergence of the time offset occurs;
storing the data of the first media stream and time compressed data of the second media stream in a media content database, the media content database being responsive to a convergence processor for retrieving the data of the first media stream and the time compressed data of the second media stream;
retrieving, in response to recipient device requests, the data of the first media stream or the time compressed data of the second media stream for delivery to the requesting recipients; and
selectively determining, in the convergence processor, which of the data of the first media stream and the time compressed data of the second media stream to deliver to each of the requesting recipients according to a relative time of initiation of delivery of the respective request.

7. The method of claim 1, comprising:
reallocating a second stream channel associated with the second media stream.

8. The method of claim 1, where controlling the content delivery device to deliver the first and second media streams comprises:
defining, at an intermediate data communications device, a set of recipient groups corresponding to at least the first and second sets of recipient devices, the first and second sets of recipient devices being defined as a member of one of the set of recipient groups; and
redefining the second recipient as a member of the recipient group corresponding to the first set of recipient devices.

9. The method of claim 1, where selectively dropping frames includes increasing duration by frame padding of a resulting enhanced media sequence.

10. The method of claim 6, where the enhancing, storing, and retrieving are predetermined and applied to the second media stream prior to storage and transmission.

11. A data communications device for delivering media to first and second recipients, comprising:
a plurality of stream channels each operable to deliver a media stream to at least one respective recipient device, the plurality of stream channels further comprising a first stream channel operable to deliver a first media stream at a first delivery rate to a first recipient device and a second stream channel operable to deliver a second media stream at a second delivery rate to a second recipient device;
a convergence filter operable to apply convergence logic to the second media stream, the convergence logic enhancing the second media stream causing the second media stream to converge to a convergence threshold in the first media stream; and
a convergence processor operable to deliver the first media stream to both the first recipient device and to the second recipient device via the first and second stream channels, the first stream processor and the second stream processor responsive to the convergence processor, the convergence processor operable to provide the first and second media streams after the convergence filter applies the convergence logic to the second media stream,
the convergence filter employing the convergence logic for enhancing at least one of the first and second media streams by selectively dropping frames, to yield an enhanced media stream, the enhanced media stream comprising an augmented version having fewer frames while delivering a substantially similar observed user experience as the corresponding media stream, where the enhanced media stream plays at no more than 1.2 times a regular playback speed.

12. The data communications device of claim 11 wherein the convergence threshold defined by the convergence processor delivering the first media stream to both the first recipient and the second recipient.

13. The data communications device of claim 11 wherein the convergence threshold is further defined by a location at which the first media stream is aligned with the second media stream.

14. The data communications device of claim 11 wherein the enhancing further comprises selective editing of frames in the media sequence.

15. The data communications device of claim 11 wherein the convergence filter is further operable to filter the media stream resulting in substantially undetectable editing of the resultant enhanced media stream.

16. The data communications device of claim 14 wherein the convergence filter is further operable to selectively edit comprising time shortening of the resultant enhanced media sequence.

17. The data communications device of claim 11 wherein the first and second media streams further comprise substantially similar content, wherein both the first and second media streams include a duplicate segment, the duplicate segments being identical.

18. The data communications device of claim 11 wherein the convergence filter is further operable to apply the convergence logic to:
 filter the second media stream according to a predetermined convergence segment, the convergence segment defining a predetermined time until the convergence threshold;
 store the first and second media streams in a media content database, the media content database responsive to a convergence processor for retrieving the first and second media streams;
 retrieve, in response to recipient requests, the first and second media streams for delivery to the requesting recipients; and
 selectively determine, in the convergence processor, which of the first and second media streams to deliver to each of the requesting recipients at a corresponding a media start time.

19. The data communications device of claim 11 wherein the convergence processor is further operable to
 transition, at the convergence threshold, the second media stream from a second stream channel to the second recipient onto a communication path from a first stream channel of the first media stream to the first recipient;
 terminate the second media stream from the second stream channel to the second recipient;
 reallocate the second stream channel, such that the transitioning of the second media stream from the second stream channel to the communication path of the first stream channel is substantially undetectable to the second recipient.

20. The data communications device of claim 11 wherein the convergence processor is further operable to deliver the first and second media streams, the delivering further comprising:
 defining, at an intermediate data communications device, a set of recipient groups corresponding to at least the first and second recipients, each of the first and second recipients defined as a member of one of the set of recipient groups; and
 redefining the second recipient as a member of the recipient group corresponding to the first recipient.

21. The data communications device of claim 14 wherein the selective editing further comprises increasing duration via frame padding of the resultant enhanced media sequence.

22. The data communications device of claim 18 wherein the convergence logic is predetermined and applied to the media stream prior to storage and transmission.

23. The data communications device of claim 11 further comprising a third stream channel wherein the convergence processor is further operable to:
 transition, at the convergence threshold, both of the first media stream from a first stream channel to the first recipient and the second media stream from a second stream channel to the second recipient onto a communication path from the third stream channel;
 terminate the first media stream from the first stream channel to the first recipient and the second media stream from the second stream channel to the second recipient; and
 reallocate the first stream channel and the second stream channel, such that the transitioning of the first media stream from the first stream channel and the second media stream from the second stream channel to the communication path of the third stream channel is substantially undetectable to the first and second recipients.

24. A method for providing media services to a plurality of subscribers comprising:
 identifying a plurality of media streams delivering media content to each of a plurality of users;
 enhancing at least a subset of the identified media streams according to convergence logic by selectively dropping frames to produce delivered media content, the delivered media content of each of the enhanced media streams based on a starting point of each of the identified media streams; and
 converging the media streams toward a convergence threshold, the convergence threshold defined by alignment of each of the media streams, the enhancing selectively augmenting the delivered media content by shifting the delivered media content of each of the media streams toward the convergence threshold, the enhanced media stream comprising an augmented version having fewer frames while delivering a substantially similar observed user experience as the corresponding media stream.

25. The method of claim 24 wherein the subset comprises all but one of the identified media streams, the unaltered media stream being the unaltered stream.

26. The method of claim 24 further comprising identifying a plurality of media streams delivering media content to each of a plurality of users, each of the media stream having a respective media content and content starting point, the content of each media stream being similar to the other identified media streams.

27. The method of claim 24 where the augmenting further comprises duration modification.

28. The method of claim 24 where the augmenting further comprises compressing via selective frame removal.

29. The method of claim 27 wherein compressing further comprises compressing according to converging logic, a subset of the plurality of the media streams to selected subscribers, the converging logic applied to each media stream corresponding to a difference in the starting times of each of the streams.

30. The method of claim 24 further comprising merging, following the applying of the media compression, each of the media streams by merging each stream of the compressed subset of media streams onto a multicast stream, the merging occurring after a convergence point at which each of the plurality of the media streams is aligned with the other media streams.

31. A method for delivering on-demand media content to a plurality of subscribers comprising:
 initiating, from a media provider having stream channels, a plurality of media streams having media content to each of a plurality of subscribers, each media stream having a respective stream channel and an independent starting time, and corresponding to at least one recipient;
 designating, in a convergence processor, a convergence set of media streams for convergence, the designated convergence set sharing similar media content and having starting times within a predetermined range;

identifying one of the media streams in the convergence set as a convergence stream;
defining, in a convergence filter, convergence logic, the convergence logic operable to selectively augment each of the media streams to generate enhanced media streams;
determining, the convergence processor, a convergence threshold defined by alignment of each of the media streams in the convergence set with the convergence stream;
augmenting, according to the converging logic, each of the media streams other than the convergence stream by selectively dropping frames, the converging logic being applied to each media stream based on a difference in the starting times of each of the stream, the compressing operable to align each of the media streams in the convergence set to the convergence stream, each augmented stream having fewer frames while delivering a substantially similar observed user experience as the corresponding media stream;
merging, by switching a source of each of the media streams in the convergence set other than the convergence stream, from the respective stream channel to the stream channel corresponding to the convergence stream, the merging resulting in a multicast stream from the stream controller corresponding to the convergence stream to each of the subscribers having media streams in the convergence set.

32. A method for delivering media to first and second recipients, the method comprising:
delivering a first media stream at a first delivery rate to a first recipient device;
delivering a second media stream at a second delivery rate to a second recipient device by applying convergence logic to the second media stream, the convergence logic selectively removing one of every N frames in order to achieve a desired acceleration of the second media stream to cause the second media stream to converge to a convergence threshold at the same time as the first media stream, the converged media stream comprising an augmented version having fewer frames while delivering a substantially similar observed user experience; and
delivering the first media stream to both the first recipient device and to the second recipient device after applying the convergence logic to the second media stream.

33. A method for delivering a streamed media feature to a plurality of recipients, the method comprising;
delivering a first media stream including a streamed feature at a first delivery rate to a first recipient device;
subsequently delivering a second media stream including the streamed feature at a second delivery rate to a second recipient device;
identifying a convergence point of equivalent progression in the streamed feature, the convergence point representing a rendered portion of the streamed feature;
applying convergence logic to the second media stream, the convergence logic selectively omitting frames from the streamed feature to compress the rendered portion of the streamed feature as an augmented stream, the second media stream thus attaining the convergence point at the same time as the first media stream, the compression providing an equivalent user experience in the compressed timeframe;
delivering the first media stream to both the first recipient device and to the second recipient device as a rendered media stream after attaining the convergence point in the streamed feature.

* * * * *